United States Patent

Schweitzer

[15] 3,681,579

[45] Aug. 1, 1972

[54] NON-INTERACTING COMPLEMENTARY CODING SYSTEM

[72] Inventor: Bernard P. Schweitzer, Los Angeles, Calif.

[73] Assignee: Hughes Aircraft Company, Culver City, Calif.

[22] Filed: Oct. 20, 1970

[21] Appl. No.: 82,246

[52] U.S. Cl. ....................235/181, 178/69 R, 325/41, 325/42, 333/30

[51] Int. Cl. ....................G06g 7/19

[58] Field of Search ...........235/181, 150.53; 333/30; 325/38 R, 38 A, 42, 41; 178/68, 69

[56] References Cited

UNITED STATES PATENTS

| | | | |
|---|---|---|---|
| 3,548,306 | 12/1970 | Whitehouse | 333/30 X |
| 3,334,307 | 8/1967 | Blum | 333/72 X |
| 3,376,572 | 4/1968 | Mayo | 333/72 X |
| 3,479,572 | 11/1969 | Pokorny | 333/30 X |
| 3,559,115 | 1/1971 | De Vries | 333/72 |
| 3,582,540 | 6/1971 | Adler et al. | 333/30 X |

*Primary Examiner*—Felix D. Gruber

*Attorney*—W. H. MacAllister, Jr. and George Jameson

[57] ABSTRACT

A system utilizing first and second pairs of code generating devices and respectively corresponding first and second pairs of decoding devices, selectively positioned in first and second transmission channels, to accommodate a pair of non-interacting complementary coded signals. The first and second pairs of code generating devices are respectively responsive to digital information from first and second data sources for causing first, second, third and fourth coded sequences to be selectively developed and propagated through the first and second transmission channels until the first, second, third and fourth coded sequences are selectively decoded by the first and second pairs of decoding devices, each decoding device being matched to a corresponding one of the coded sequences. The first and second pairs of decoding devices selectively combine the first, second, third and fourth coded sequences such as to enable the system to function as two independent and non-interacting signal channels.

5 Claims, 7 Drawing Figures

INVENTOR.
BERNARD P. SCHWEITZER,
BY
Walter J. Odam
ATTORNEY.

FIG. 6.

ACOUSTIC MEMORY COMPLEMENTARY CODES
- AUTO AND CROSS CORRELATION PRODUCTS

| OPERATION COMPLEMENTARY CODE | N BIT CODE (N=8) | TIME DOMAIN SIDE LOBES |
| --- | --- | --- |
| AA | - - - + - - + - / - - - + - - + - | 1,0,1,0,3,0,-1,8,-1,0,3,0,1,0,1 |
| BB | - - - + + + - + / - - - + + + - + | -1,0,-1,0,-3,0,1,8,1,0,-3,0,-1,0,-1 |
| AA + BB | | 0,0,0,0,0,0,0,16,0,0,0,0,0,0,0 |
| NON-INTERACTING COMPLEM. CODE | | |
| CC | - + - - - + + + / - + - - - + + + | -1,0,-1,0,-3,0,1,8,1,0,-3,0,-1,0,-1 |
| DD | - + - - + - - - / - + - - + - - - | 1,0,1,0,3,0,-1,8,-1,0,3,0,1,0,1 |
| CC+DD | | 0,0,0,0,0,0,0,16,0,0,0,0,0,0,0 |
| CROSS CORRELATIONS | | |
| AC | - - - + - - + - / - + - - - + + + | -1,-2,-3,0,1,2,-1,0,1,2,-1,0,3,-2,1 |
| BD | - - - + + + - + / - + - - + - - - | 1,2,3,0,-1,-2,1,0,-1,-2,1,0,-3,2,-1 |
| AC+BD=0 | | 0,0,0,0,0,0,0,0,0,0,0,0,0,0,0 |

NON-INTERACTING COMPLEMENTARY CODING SYSTEM

BACKGROUND OF THE INVENTION

1. Field of the Invention

This invention relates to coding systems and more particularly to a non-interacting complementary coding system.

2. Description of the Prior Art

Complementary coding systems are used in many applications. A classic article on complementary codes, entitled "Complementary Series", has been written by Marcel Golay and can be found on pp. 82–87 of IRE Transactions on Information Theory, dated April 1961. One of the main reasons for using complementary codes, or other codes, is to obtain pulse compression. Pulse compression techniques enable sufficient transmission energy to be transmitted into the medium being utilized while still maintaining high resolution in radar applications, a high data rate in memory system applications, or a high bandwidth in a communications system application. The transmission of a long sequence of coded pulses increases the transmitted power, while the decoding of the coded sequence of pulses produces short pulses which are required to achieve high resolution, high data rate or high bandwidth.

One example of a presently used complementary coding system involves acoustic channels used in a memory system. However, all presently utilized complementary coding arrangements or systems have the major disadvantage of inefficient channel utilization, since they require two independent transmission channels to obtain one signal channel. Some disadvantages resulting from this inefficient channel utilization of complementary coding systems include bulk, excessive cost, relatively low information storage capacity in relation to the weight involved and uneconomical operation.

SUMMARY OF THE INVENTION

Briefly, applicant has provided a more economical, more compact, more efficient and relatively high density information storage system utilizing two pairs of code generating devices and two pairs of decoding devices selectively positioned in a pair of transmission channels to enable the system to function as two independent and non-interacting signal channels.

It is therefore an object of this invention to provide a more economical, more compact, more efficient and high density information storage system.

Another object of this invention is to provide an improved delay line.

Another object of this invention is to provide a more efficient channel utilization of a pair of transmission channels.

A further object is to approximately double the storage capacity of any system utilizing complementary coding by using a non-interacting complementary (N.I.C.) coding arrangement.

BRIEF DESCRIPTION OF THE DRAWINGS

These and other objects, features and advantages of the invention itself, will become more apparent to those skilled in the art in the light of the following detailed description taken in consideration with the accompanying drawings wherein like reference numerals indicate like or corresponding parts throughout the several views wherein:

FIG. 6 illustrates auto and cross-correlation products of complementary codes.

DESCRIPTION OF THE PREFERRED EMBODIMENT

Figure 1:
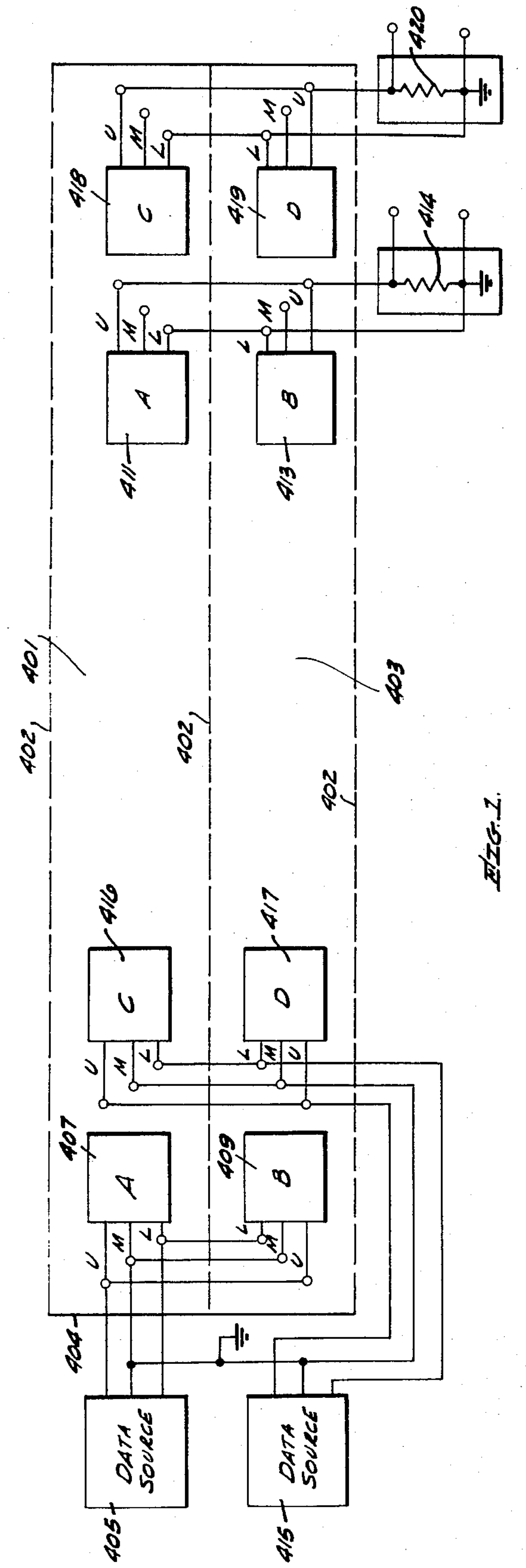
FIG. 1 is a schematic block diagram of an N.I.C. coding system in accordance with an embodiment of this invention.

Referring now to the drawings, FIG. 1 is a schematic block diagram of an N.I.C. coding system in accordance with an embodiment of this invention. For illustrative purposes, the upper surface of a receptive acoustic medium 404 is shown divided into a pair of isolated acoustic transmission channels 401 and 403 to permit separate isolated transmissions through each transmission channel of different acoustic energy waves containing signal information. It should be understood that additional pairs of transmission channels can be utilized on the upper surface, as well as the lower surface (not shown), of the medium 404 in conformance with the teachings of the invention.

The embodiment of FIG. 1 is mechanized to form two signal channels. In a first signal channel code generating devices or interdigital transmit transducers 407 and 409 are respectively disposed on one end of the transmission channels 401 and 403, and decoding devices or interdigital receive transducers 411 and 413 are respectively disposed at the opposite end of the transmission channels 401 and 403. In a second signal channel code generating devices or interdigital transmit transducers 416 and 417 are respectively positioned adjacent to the transducers 407 and 409, and decoding devices or interdigital receive transducers 418 and 419 are respectively positioned adjacent to the transducers 411 and 413. As will be discussed later, the transducers 407, 409, 411, 413, 416, 417, 418 and 419 are physically laid out in preselected arrangements such that the transducers 407 and 411 each develop an A-code, the transducers 409 and 413 each develop a B-code, the transducers 416 and 418 each develop a C-code, and the transducers 417 and 419 each develop a D-code.

The transducers 416 and 417 are respectively positioned a first predetermined distance from the transducers 407 and 409, while the transducers 418 and 419 are respectively positioned a second predetermined distance from the transducers 411 and 413. While the physical distance between the A-coded transducers 407 and 411 is always equal to the physical distance between the B-coded transducers 409 and 413, and the physical distance between the C-coded transducers 416 and 418 is always equal to the physical distance between the D-coded transducers 417 and 419, the physical distance between the A-coded transducers 407 and 411 does not necessarily have to be equal to the physical distance between the C-coded transducers 416 and 418, within the scope of the invention.

As will be described later, in relation to FIG. 3, each of the transducers 407, 409, 411, 413, 416, 417, 418 and 419 has three terminals, namely U, M and L. In response to digital data information applied from a data source 405 to the U, M and L terminals of each of the transmit transducers 407 and 409, the transducers 407 and 409 cause surface waves or stress waves of A and B coded acoustic energy to propagate along the surface of the channels 401 and 403 until the A and B-coded acoustic waves are respectively received by the receive transducers 411 and 413. The U and L terminals of the A-coded transducer 411 are parallel coupled to the U and L terminals of the B-coded transducer 413, and also coupled across a resistor or summer 414, which has one end grounded. The resistor 414 sums the autocorrelation functions of the A and B-codes to produce a first output containing the digital information propagated in the form of stress waves and charge dipoles (to be discussed later) through the first signal channel.

In a like manner, in response to digital data information applied from a data source 415 to the U, M and L terminals of each of the transmit transducers 416 and 417, the transducers 416 and 417 cause surface waves of C and D-coded acoustic energy to respectively propagate along the channels 401 and 403 until the C and D-coded acoustic waves are respectively received by the receive transducers 418 and 419. The U and L terminals of the C-coded transducer 418 are parallel coupled to the U and L terminals of the D-coded transducer 419, and also coupled across a resistor or summer 420, which has one end grounded. The resistor 420 sums the autocorrelation functions of the C and D-codes to produce a second output containing the digital information propagated in the form of stress waves and charge dipoles through the second signal channel.

Additional information in relation to the codes A, B, C and D, the mechanization of transducers to develop codes, autocorrelation function, the utilization of two transmission channels to develop two signal channels which do not interact with each other, etc., will be presented more fully in connection with FIGS. 2, 3, 4, 5 and 6. It will now be shown how adjacent transmission channels, such as the channels 401 and 403, can be isolated from each other.

In FIG. 1 adjacent channels 401 and 403 on the upper (or lower) surface of the medium 404 are shown isolated from each other and from other adjacent channels (not shown) by channel isolators 402. However, there are several different ways for achieving channel isolation. These ways will now be discussed.

The acoustic surface wave in each channel spreads as it leaves the transmit transducer. The angle of spreading depends upon the width of the transmit transducer as well as the acoustic wavelength in the medium. The spreading of the acoustic beam follows the laws of diffraction wherein the sine of the angle of divergence is proportional to the ratio of the wavelength to the transducer width. The beam width increases proportional to the product of the distance from the transmit transducer and the sine of the angle of divergence. Depending on the distance from the transmit transducer, the beam will spread such that a portion of the acoustic energy could overlap into the adjacent acoustic channel. The beam spread may be limited by bounding the acoustic channel by a channel isolator 402 or by using the inherent material characteristics of the acoustic medium to provide self channeling.

One type of channel isolator that may be used is a dissipative material, such as apiezon wax or silastic rubber, which is deposited axially between adjacent acoustic channels. A dissipative material absorbs any spreading acoustic energy in any given channel which tends to spread outside of that channel and is incident upon the dissipative isolator. Another type of channel isolator that may be used in a non-dissipative material which has a higher acoustic propagation velocity than that of the medium 404. The material with the higher acoustic propagation velocity tends to cause the portion of the acoustic wave that impinges onto it to travel faster than the portion of the wave that travels within the desired channel. The acoustic energy within the spreading channel therefore tends to bend toward the center of the channel. The acoustic energy is therefore conserved since it is deflected into the channel wherein it can carry signal information. A third means for providing isolation between channels is to use the directional properties of the material used as the acoustic medium to provide inherent isolation. Some types of acoustic materials, such as lithium niobate and bismuth germanium oxide, have a self-focusing or guiding property which permits channel isolation to be obtained without adding physical isolators. The diffraction of the acoustic wave is dependent upon the physical characteristics of the medium. For an isotropic medium the diffraction angle will be related to the ratio of the acoustic wavelength to the transducer width as previously stated. However, an anisotropic material like a piezoelectric crystal affects the acoustic wave and either tends to make the spreading either worse than or better than that obtained for the isotropic case. Materials whose acoustic velocity decreases when a wave is propagated off of the crystal axis when compared with the on axis velocity will have a tendency to cause the diffraction angle to become smaller and therefore the beam will spread less and tend to confine itself into a channel. Bismuth germanium oxide and lithium niobate have axes which exhibit the characteristics described. Quartz, however, has a velocity characteristic which is opposite to materials like bismuth germanium oxide and lithium niobate in that the velocity of propagation increases when an acoustic beam propagates off axis. This characteristic results in an increase in the diffraction angle and therefore the beam becomes more divergent than it would be in the isotropic case. The basis for the above is that a wave will propagate normal to the reciprocal velocity surface which further explains the phenomenom described herein. Isolation between channels may also be attained by using an axially positioned groove between adjacent channels as a boundary for the acoustic wave. The acoustic wave which impinges upon the groove wall will be prevented from spreading into adjacent channels and therefore the wave will be confined to one channel. Furthermore, additional attenuation of the portion of the wave which impinges upon the wall of the groove may be attained when the groove is filled with an absorbing material. Acoustic energy which would tend to propagate across the groove thus will be attenuated upon interacting with the dissipative medium which fills the groove.

The medium 404 may be composed of any type of piezoelectric material, such as quartz, or may be composed of any type of non-piezoelectric material, such as glass or sapphire. When the medium 404 is composed of a piezoelectric material, each of the associated transmit and receive transducers in each channel is an interdigital transducer having fingers which will be discussed later. The fingers may be any suitable type of metallic conductor such as, for example, aluminum, which is placed on the surface of the medium 404 by, for example, photo-lithographic techniques, which are well known in the art, or by any other suitable method. When a piezoelectric material is used as the medium 404 each interdigital transmit transducer converts the input electrical data information signal from its associated data source into a mechanical force in the form of a stress wave which moves in the associated channel through the medium 404. The stressed piezoelectric material develops alternating moving charges which move with the stress wave. The associated interdigital receive transducer receives and converts the alternating moving charges back to an electrical signal which is developed across its output U and L terminals for subsequent application to its associated summing resistor.

When a non-piezoelectric material, such as glass, is used for the medium 404, layered transmit and receive transducers are utilized at opposite ends of the upper (or lower) surface of the non-piezoelectric material. A suitable metal in the form of interdigital thin film fingered devices is deposited upon the surface of the non-piezoelectric medium by photo-lithographic techniques or by any other suitable method. Over each of these devices a thin film piezoelectric material is deposited. Each layered transducer is comprised of the combination of a thin film fingered device and of the thin film piezoelectrical material deposited on the device. In the operation of channels utilizing a non-piezoelectric medium and layered transducers, the conversion from a stress wave into charges does not take place until the stress wave reaches the associated layered receive transducer.

Throughout the remaining part of this description a piezoelectric material, such as quartz, will be used with the interdigital transducers to explain the invention. It should, however, be understood that the teachings of this invention permit the use of the piezoelectric medium with the interdigital transducer or the non-piezoelectric medium with the layered transducers, or by other means suitable for the excitation of an acoustic signal in the medium. It should furthermore be understood that the coding system of this invention is not restricted to a piezoelectric medium with interdigital transducers or to a non-piezoelectric medium with layered transducers. For example, this invention can be used in any system that uses complementary codes to achieve either pulse compression or any other suitable purpose. The invention can also be used with electromagnetic radiation where, for example, two radar sets of different frequencies illuminate the same patch of ground.

The polarity of the input electrical signal to each transmit transducer determines the polarity of the charge on the resultant acoustic stress wave. There is a delay involved in each channel which causes each channel to act as a delay line. The delay involved between the time that a signal excitation is applied to a transmit transducer to create the acoustic stress wave and charges and the time that the corresponding receive transducer reproduces the signal information is dependent upon the type of medium used and the physical distance between the front ends of corresponding transmit and receive transducers, such as the transducers 407 and 411. If quartz is the piezoelectric material used as the medium 404, the acoustic wave information in each channel propagates at the approximate rate of one-eighth of an inch per microsecond.

To more clearly explain the structure and operation of the embodiment of FIG. 1, reference will now be made to FIGS. 2, 3, 4, 5 and 6.

Figure 2:
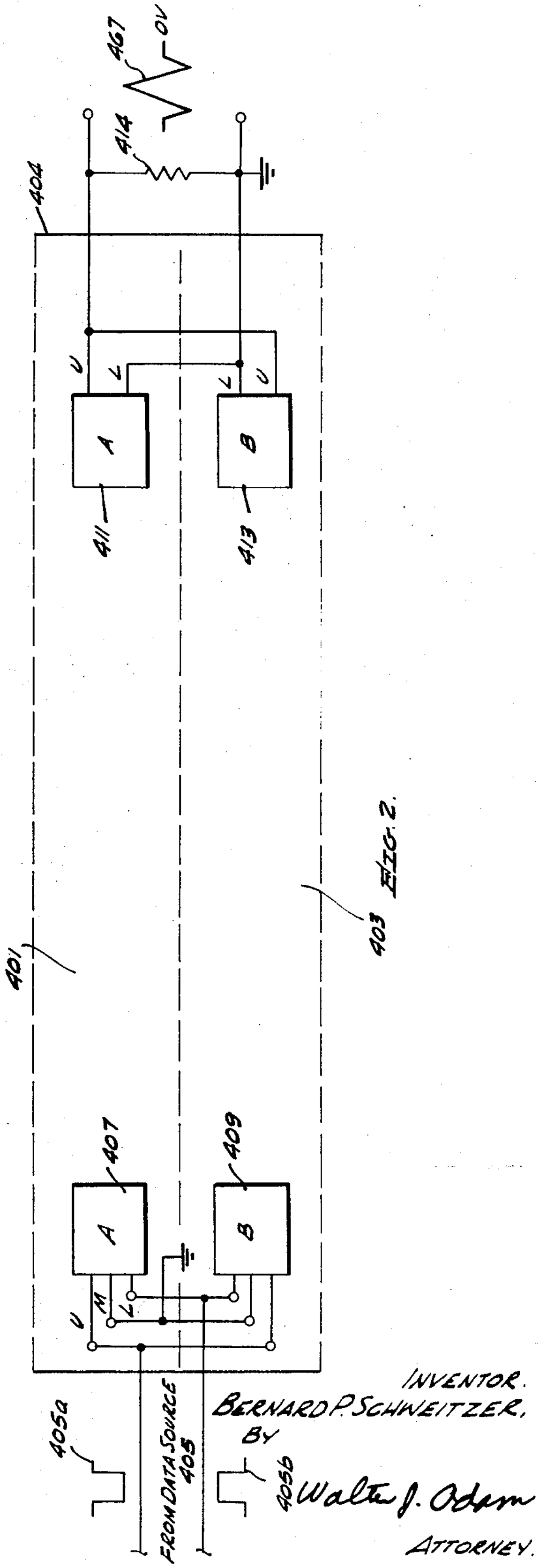
FIG. 2 is a schematic block diagram of one of the signal channels of FIG. 1.

FIG. 2 is a schematic block diagram of one of the two signal channels of FIG. 1. The signal channel disclosed in FIG. 2 comprises the transducers 407, 409, 411 and 413, the summer or resistor 414, and of course the transmission channels 401 and 403 which are commonly shared by the two signal channels of FIG. 1. The relative placement of the transducers 407, 409, 411 and 413 in the transmission channels 401 and 403 has been previously described in relation to FIG. 1. As previously stated, the transducers 407 and 411 are each physically arranged to develop an A-code, while the transducers 409 and 413 are each physically arranged to develop a B-code. The A and B codes form a complementary code pair of the type described by Marcel Golay in his article, "Complementary Series", on pp. 82–87 of IRE Transactions on Information Theory, dated April 1961. In Golay's article a complementary code is basically defined as a pair of binary sequences of length N, whose elements are +1 and −1, and whose autocorrelation functions are such that the sum of each of the corresponding terms of the autocorrelation functions is identically zero, except for the center terms, whose sum is equal to 2N. The autocorrelation function of a binary sequence of length N (Code A) will be discussed later in conjunction with FIGS. 3, 4 and 5.

Complementary or push-pull pulses 405A and 405B, or their inversions, are respectively supplied from the data source 405 to the U and L input terminals of each of the transmit transducers 407 and 409, which have their respective M input terminals connected to ground. The simultaneous pulses 405A and 405B represent the development of a digital "1" from the data source 405, while the simultaneous inversions of the pulses 405A and 405B represent a digital "0". The digital information supplied by the data source 405 to the transducers 407 and 409 is composed of sequences of digital "1"s and "0"s. The structure and operation of the channel 401 in FIG. 2 will now be developed more fully by referring to FIG. 3.

Figure 3:
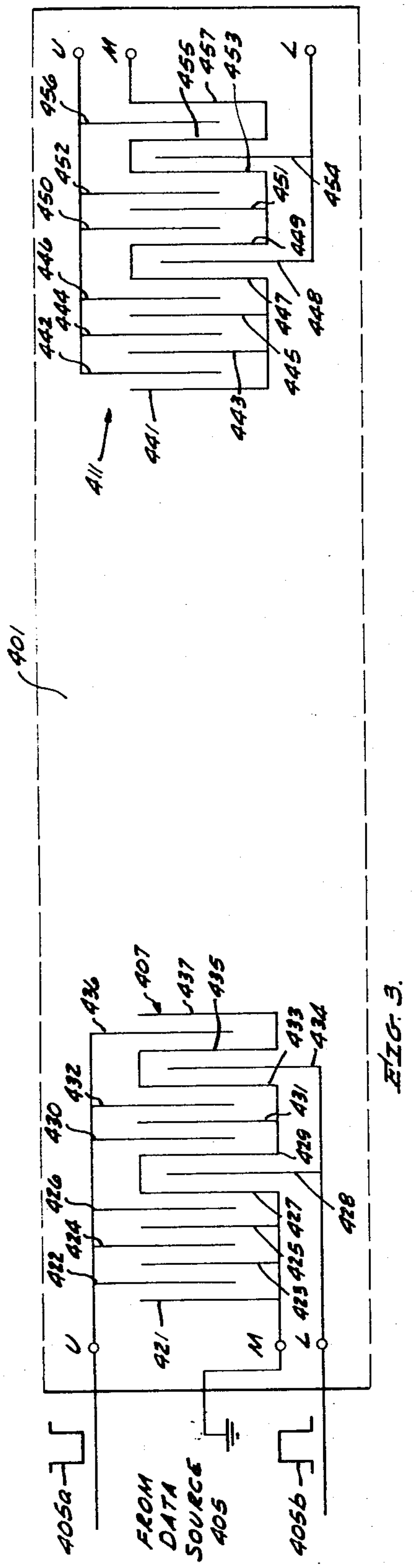
FIG. 3 is a schematic circuit diagram of one of the adjacent channels of FIG. 2.

FIG. 3 discloses that the interdigital transmit transducer 407 must have 2N+1 fingers or digits to generate a code of a certain number (N) of bits when the transducer 407 is impulsed by the pulses 405A and 405B. For purposes of explanation, the A-code will be chosen to be equal to the eight-bit sequence (where N = 8) of −1, −1, −1, +1, −1, −1, +1, and −1. Therefore, in order to comply with Golay's requirements for complementary codes, the B-code must be equal to the eight-bit sequence of −1, −1, −1, +1, +1, +1, −1 and +1. In order to mechanize the transducer 407 to be A-coded, the transducer 407 must have a sequence of 17 fingers 421 through 437, since 2N+1 = 17 when N = 8. To generate the aforementioned A-code, the fingers 422, 424, 426, 430, 432 and 436 are all coupled to the U input terminal; the fingers 421, 423, 425, 427, 429, 431, 433, 435 and 437 are all coupled to the M input terminal; and the fingers 428 and 434 are coupled to the L input terminal.

The fingers 421 through 437 selectively form N (eight in this illustration) sequentially-aligned, basic, three-finger, elemental, interdigital transducers which comprise slots or groups of fingers consisting of: 421 through 423, 423 through 425, 425 through 427, 427 through 429, 429 through 431, 431 through 433, 433 through 435, and 435 through 437. Each three-finger transducer group has a bandwidth approximately equal to 1/T, where T is the time taken by the acoustic wave in traveling across an elemental transducer when responding to one of the pulses 405A and 405B. The nature of the ensuing processing permits a number of basic three-finger transducer groups to operate as if they were independent when excited in parallel with a single pulse. Furthermore, by having the transducer 407 composed of a number of basic three-finger transducer groups, the power into the transducer 407 can be increased in proportion to the number of basic three-finger transducer groups without reducing the bandwidth. The coded transducer 407 is thus a wideband device regardless of the number of basic three-finger transducer groups used in its construction. The receive transducer 411 has fingers 441 through 457 which respectively correspond in design and operation to the fingers 421 through 437 of the transmit transducer 407. The output from the transducer 411 is taken from its U and L terminals, with its M terminal remaining unconnected.

In operation, upon the application of the pulses 405A and 405B to the U and L input terminals of the transducer 407, the aforementioned basic three-finger transducer groups of 421–423, 423–425, 425–427, 427–429, 429–431, 431–433, 433–435 and 435–437 develop corresponding stress waves accompanied by respective charge dipoles of the respective polarities −1, −1, −1, +1, −1, −1, +1 and −1. For example, each of the basic three-finger transducer groups of 421–423, 423–425, 425–427, 429–431, 431–433 and 435–437 develops a dipole of polarity −1 when the negative voltage pulse 405A is applied to the fingers 422, 424, 426, 430, 432 and 436, since the fingers 421 and 423, 423 and 425, 425 and 427, 429 and 431, 431 and 433, and 435 and 437 are all coupled to ground. On the other hand, each of the basic three-finger transducer groups of 427–429 and 433–435 develops a dipole of polarity +1 when the positive voltage pulse 405B is applied to the fingers 428 and 434, since the fingers 427 and 429, and 433 and 435 are all coupled to ground. It should also be understood that when the data source 405 of FIG. 2 develops a logical "0" state output the inversions of the pulses 405A and 405B are respectively applied to the U and L input terminals of the transducer 407, resulting in the development therefrom of the dipole sequence having the respective polarities +1, +1, +1, −1, +1, +1, −1 and +1, while the inversions of the pulse 405A and 405B are respectively applied to the U and L input terminals of the transducer 409, resulting in the development therefrom of the dipole sequence of having the respective polarities +1, +1, +1, −1, −1, −1, +1 and −1. It is important to note that the relationship between Golay's complementary codes is unchanged when the signs of all of the terms of the complementary codes are changed. As a result, for further explanation of this fourth embodiment, only the relative polarities shown by the pulses 405A and 405B will be considered.

Figure 4:
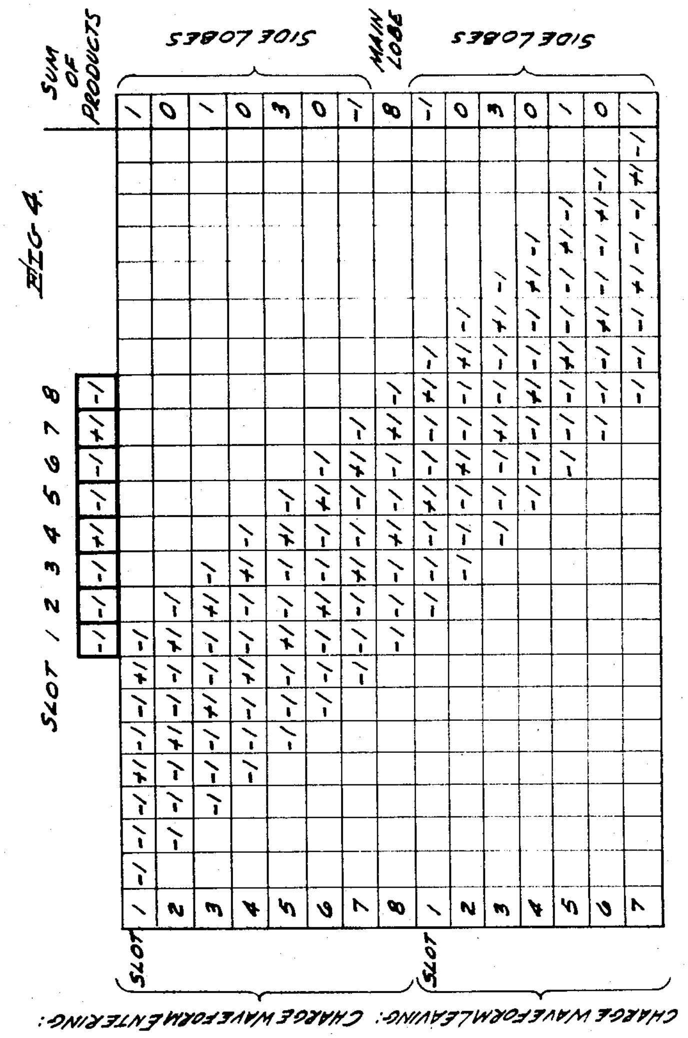
FIG. 4 illustrates the A-code and autocorrelation function of the A-code.

The dipole wave of the polarities −1, −1, −1, +1, −1, −1, +1 and −1, which was developed by the transducer 407 in response to the respective application of the pulses 405A and 405B to the U and L input terminals of the transducer 407, propagates along the channel 401 until it reaches and is processed by the receive transducer 411. As specified previously, the transducer 411 is also A-coded. As the A-coded dipole wave (−1, −1, −1, +1, −1, −1, +1 and −1) enters the A-coded receive transducer 411, an autocorrelation process of multiplication and addition takes place, as shown in FIG. 4. For example, as the eighth term (−1) of the charge waveform moves into the first group or slot 1 of the transducer 411, a one-term product (−1 × −1) of +1 results, as shown in the column designated "Sum of Products". In like manner, as the eighth term (−1) of the charge waveform moves into slot 2, the seventh term (+1) moves into slot 1, thereby developing the products −1 × −1 and −1 × +1, whose sum is equal to zero, and so on. When the eighth term of the charge waveform moves into slot 8, eight products are developed whose sum $((-1)^2 + (+1)^2 + (-1)^2 + (-1)^2 + (+1)^2 + (-1)^2 + (-1)^2 + (-1)^2 = 8)$ is called the mainlobe of the A-coded autocorrelation function. Subsequently, the charge waveform starts leaving the slots. The movement of the A-coded charge waveform into and exit from the A-coded receive transducer 411 sequentially develops the terms 1, 0, 1, 0, 3, 0, −1, 8, −1, 0, 3, 0, 1, 0, 1 of the autocorrelation function of the A-code, as shown in the column designated "Sum of Products" in FIG. 4, with the 8 representing the mainlobe and the remaining terms representing the sidelobes.

Figure 5:
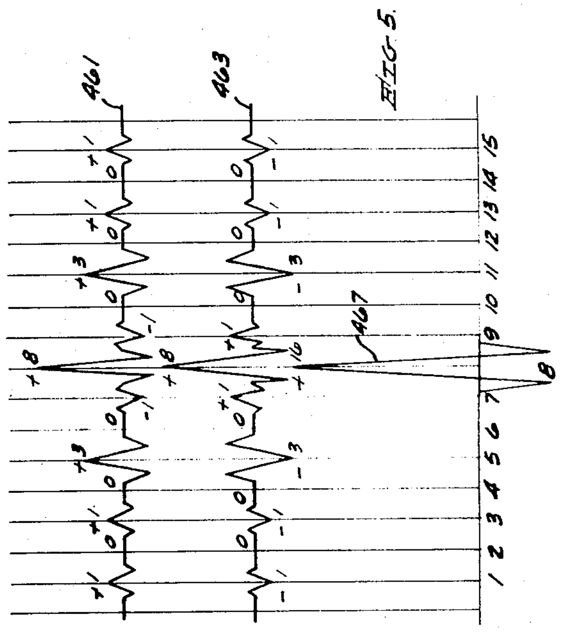
FIG. 5 illustrates graphs of the autocorrelation functions of the A and B codes generated in the signal channel of FIG. 2.

Returning now to FIG. 2, the aforementioned sequential terms of the autocorrelation function of the A-code appear between the U and L terminals of the transducer 411 and are illustrated by the waveform 461 in FIG. 5. It should be recalled at this time that it was specified that the A and B codes were a complementary code pair of the type described by Golay in his aforementioned article. It should also be recalled that the B-code was required to be −1, −1, −1, +1, +1, +1, −1 and +1, since the A-code was given as −1, −1, −1, +1, −1, −1, +1 and −1. By using the teachings discussed in relation to FIG. 3, the fingers of the transducers 409 and 413 can be arranged to enable the transducers 409 and 413 to develop the B-code. The autocorrelation function of the B-code is then developed in a manner similar to the development of the autocorrelation function of the A-code, which was discussed in relation to FIG. 4. The sequentially developed terms of the autocorrelation function of the B-code are therefore found to be −1, 0, −1, 0, −3, 0, 1, 8, 1, 0, −3, 0, −1, 0 and −1. These terms of the autocorrelation function of the B-code appear between the U and L terminals of the transducer 413 and are illustrated by the waveform 463 in FIG. 5.

Since the U and L terminals of the transducer 411 are parallel coupled to the U and L terminals of the transducer 413 and are also coupled across the resistor 414, the resistor 465 sums the corresponding terms of the autocorrelation functions of the A and B codes to develop the waveform 467, which is shown in FIGS. 2 and 5.

A comparison of each of the terms of the waveforms 461 and 463 discloses that the sum of each of the corresponding terms of the autocorrelation functions of the A and B codes is equal to zero, with the exception of the middle term which is equal to 2N, or +16 when N=8. As a result, the A and B codes have been found to satisfy Golay's requirements for a complementary code pair. It should be noted at this time that each term of the waveforms 461, 463 and 467 is a Ricker pulse, with the digital information related to each Ricker pulse being contained within the center portion or mainlobe of each Ricker pulse. The term "Ricker pulse", as used here and in subsequent pages of this application, is meant to define a pulse similar in appearance to each of the wavelet forms illustrated and discussed by Norman Ricker in his article entitled "Wavelet Contraction, Wavelet Expansion, and the Control of Seismic Resolution", pages 769 through 792 of Vol. XVIII, No. 4, issue of *Geophysics*, dated October 1953. As illustrated by the waveforms 461, 463 and 467, each Ricker pulse has a main lobe and a sidelobe on each side of the main lobe.

The operation of FIG. 2 has been previously discussed in relation to only one bit of digital information (pulses 405A and 405B) being stored or propagated through the signal channel composed of the transmission channels 401 and 403, to cause the signal channel to act as a delay line or storage unit before the digital information is recovered in the form of a mainlobe Ricker pulse. However, it is more desirable to store a plurality of bits in the signal channel of FIG. 2 by having the data source 405 sequentially pulse the transmit transducers 407 and 409 with a pair of push-pull binary sequences of logical "1"s and "0"s containing the information to be stored. Upon being driven by the sequences of logical "1"s and "0"s, the transducers 407 and 409 cause sequences of stress waves and charges to propagate through the respective channels 401 and 403 to the receive transducers 411 and 413, whose outputs are summed in the summer or resistor 414 to produce sequences of output Ricker pulses. The faster the transducers 407 and 409 are pulsed, the more data can be stored in the signal channel of FIG. 2. In actual operation the data source 405 supplies a pair of complementary or push-pull data streams to the transmit transducers 407 and 409. The interval between bits in each data stream is such that the Ricker pulses developed across the summer or resistor 414 are as close together as possible without obliterating the digital information contained in each Ricker pulse. If the rate (data rate) at which the data is supplied to the signal channel of FIG. 2 is increased such that adjacent Ricker pulses, developed across the resistor 414, overlap each other by, for example, one-third or one-fourth, the digital information contained in each Ricker pulse is not interferred with or obliterated. This lack of interference between adjacent Ricker pulses is due to the fact that the digital information in each Ricker pulse is contained in the mainlobe of that Ricker pulse, which occupies approximately the middle third of the Ricker pulse.

In recirculating memory applications, it is necessary to synchronously sample the center portion or mainlobe of each of the output Ricker pulses, developed across the resistor 414, in order to retrieve the digital information contained therein. In acoustic delay line applications, the digital information contained in the output Ricker pulses may be retrieved by, for example, applying the output Ricker pulses to peak voltage locating devices such as negative and positive voltage comparators (not shown) whose respective threshold levels are set above the maximum sidelobe level of the output Ricker pulses. Since the mainlobe of each output Ricker pulse is much higher than any of its associated sidelobe levels, only one digital output would be developed from one of the voltage comparators for each of the output Ricker pulses. The respective digital outputs from the negative and positive voltage comparators could be combined in, for example, a summing network of resistors (not shown) in order to retrieve, after a delay period determined by the physical distance between identically coded transducers and the type of medium 404 used, the data information supplied by the data source 405.

If the distance between adjacent fingers in, for example, the transducer 407 is represented by Δ (delta), the distance that an elemental transducer, for example, 421–423 encompasses is equal to 2Δ. Each time that the transducers 407 and 409 are pulsed by either a logical "0" or "1" from the data source 405, a Ricker pulse is subsequently developed at the output of the summer or resistor 414. The length of this Ricker pulse is 4Δ/V, where V is the acoustic velocity in the acoustic medium used. Since the sidelobes of adjacent Ricker pulses were specified to overlap by approximately one-third in order to increase the bit density, the bit time in the signal channel of FIG. 2 would be equal to two-thirds of the length of a Ricker pulse (⅔ of 4Δ/V or 8Δ/3V).

When quartz is used as the medium, the acoustic wave travels through the quartz medium at an approximate velocity (V) of one-eighth inch per microsecond ($\mu$ sec). If a 64 microsecond long delay line is desired, the distance between corresponding fingers of, for example, the transmit transducer 407 and the receive transducer 411 must be approximately 8 inches. The rate at which digital data is clocked from the data source 405 to the signal channel of FIG. 2 is determined by the clock pulse rate of a clock pulse generator (not shown). If the clock pulse rate (F) were 25 MHz, the interpulse period of the clock or bit time would be equal to 1/F or 40 *n* sec. With a bit time of 40

$n$ sec, 1,600 bits of digital information could be stored in the signal channel of FIG. 2. Furthermore, the distance between adjacent fingers of, for example, the transducer 407 would be equal to 3V/8F or about three sixteen-hundredths inch.

The duration of each pair of push-pull pulses, such as the pulses 405A and 405B, from the data source 405 may typically be three-eighths of the interpulse period of the clock pulse. When the acoustic medium is quartz and the system clock pulse rate is 25 MHz, this pulse duration would be about 15 $n$ sec. In addition, the center to center spacing of adjacent transducer fingers would correspond to the propagation time of approximately 15 $n$ sec.

Returning now to FIG. 1, it should be recalled that two signal channels share the transmission channels 401 and 403. The structure and operation of the first signal channel have been described in detail in relation to FIGS. 2, 3, 4 and 5. The second signal channel, as previously specified, includes the data source 415, the C-coded transducers 416 and 418, the D-coded transducers 417 and 419 and the summer or resistor 420. The relative placement of the transducers in the first and second signal channels has also been previously discussed. The components 415, 416, 417, 418, 419, 420 of the second signal channel respectively correspond in structure and operation to the components 405, 407, 409, 411, 413 and 414 of the first signal channel.

In conformance with the teachings described in relation to FIGS. 3, 4 and 5, the transducers 416 and 418 are each physically arranged to develop a C-code, while the transducers 417 and 419 are each physically arranged to develop a D-code. The C and D codes form a complementary code pair of the type described by Marcel Golay in his aforementioned article. The second signal channel functions in a manner, similar to that of the first signal channel, to develop and process the complementary codes C and D. However, these complementary C and D codes are chosen, as will be explained later, such that after autocorrelation summing, the C and D codes do not interact with the A and B codes and vice versa, even though they respectively share the same acoustic channel 401 and 403. The summer or resistor 420 sums the corresponding terms of the autocorrelation functions of the C and D codes, in a manner similar to that described in relation to the first signal channel of FIG. 2. As a result, the sum of each of the corresponding terms of the autocorrelation functions of the C and D codes is zero, with the exception of the middle term of the sum, which is equal to 2N. It will now be shown how two sets of complementary series are mutually non-interacting even though both sets share the same acoustic channels 401 and 403.

Before describing non-interacting complementary codes, it should be recalled that Golay, in his aforementioned article, effectively defined a complementary code as a pair of binary sequences of length N, whose elements are +1 and −1, and whose autocorrelation functions are such that their sum is identically zero, except for the center term, which is equal to 2N. It should also be recalled that the circuitry of FIG. 1 was stated to be mechanized such that the A and B codes form a set or pair of complementary codes (C,D), where each of the sets of complementary codes (A,B) and (C,D) fulfills Golay's requirements for complementary codes. By constructing the complementary series pairs in sets of two, where the sets are mutually non-interacting, two acoustic channels, such as the channels 401 and 403, can be utilized to provide two signal channels; thereby producing a resultant storage system having a factor of two improvement over having just one signal channel in the two acoustic channels.

Non-interacting sets of complementary series pairs, which henceforth will be referred to as non-interacting complementary (N.I.C) codes, are defined by the fact that the sum of the corresponding terms of the cross-correlation functions of the N.I.C. codes is identically zero in all terms. To illustrate, let the A, B, C and D codes generated in FIG. 1 have the elements as shown in the following:

$A=(a_1, a_2, \ldots, a_n)$,
$B=(b_1, b_2, \ldots, b_n)$,
$C=(c_1, c_2, \ldots, c_n)$, and
$D=(d_1, d_2, \ldots, d_n)$.

Let AA represent the autocorrelation function of the code A, and BB represent the autocorrelation function of the code B. Now let the autocorrelation terms (derived from the process of multiplication and addition discussed in relation to FIG. 4) of the respective codes A and B be as shown in the following:

$AA=(x_1, x_2, x_3, \ldots, x_{2N-1})$ and
$BB=(y_1, y_2, y_3, \ldots, y_{2N-1})$.

As indicated, the autocorrelation function of the A-code (AA) and the autocorrelation function of the B-code (BB) each have 2N−1 terms. The A and B codes will meet Golay's requirements for a complementary code pair if:

$x_i + y_i = 0$, where $i$ represents any positive integer from 1 through 2N−1, except N, and (1)

$x_N + y_N = 2N$. (2)

Let AC represent the cross-correlation function of the A and C codes, which is derived by a process of multiplication and addition in the acoustic channel 401 in a manner similar to that shown in relation to FIG. 4. Let BD represent the cross-correlation function of the B and D codes, which is derived by a process of multiplication and addition in the acoustic channel 403 in a manner similar to that shown in relation to FIG. 4. Each of the cross-correlation functions AC and BD, has 2N−1 terms. Now let the cross-correlation terms of AC and BD be as shown in the following:

$AC=(q_1, q_2, q_3, \ldots, q_{2N-1})$ and
$BD=(r_1, r_2, r_3, \ldots, r_{2N-1})$.

Then (A,B) and (C,D) are N.I.C. codes if:

$q_i + r_i = 0$, where $i = 1,2 \ldots 2N-1$. (3)

An example of N.I.C. codes will now be given. Let ($A_1$, $B_1$) and ($C_1$, $D_1$) be two sets of complementary codes, where the codes $A_1$, $B_1$, $C_1$ and $D_1$ have the elements as shown in the following:

$A_1=(1,1)$, (4)
$B_1=(1,-1)$,
$C_1=(1,-1)$ and
$D_1=(1,1)$.

The autocorrelation functions of the codes $A_1$, $B_1$, $C_1$ and $D_1$ have the terms as shown in the following:

$A_1A_1=(1,2,1)$,
$B_1B_1=(-1,2,-1)$,
$C_1C_1=(-1,2,-1)$ and
$D_1D_1=(1,2,1)$.

The respective summing of corresponding terms of the autocorrelation functions $A_1A_1$ and $B_1B_1$ and of the autocorrelation functions $C_1C_1$ and $D_1D_1$ discloses that each of the complementary code sets ($A_1$,$B_1$) and ($C_1$,$D_1$) fulfills Golay's requirements in equations (1) and (2) for complementary codes, as shown in the following:

$A_1A_1+B_1B_1=(0,4,0)$, and $C_1C_1+D_1D_1=(0,4,0)$.

The cross-correlation functions of the complementary code sets ($A_1$,$B_1$) and ($C_1$, $D_1$) are shown in the following:

$A_1C_1=(-1,0,1)$, and $B_1D_1=(1,0,-1)$.

The sums of the corresponding terms of the cross-correlation functions of the complementary code sets ($A_1$,$B_1$) and ($C_1$,$D_1$) are shown in the following:

$A_1C_1+B_1D_1=(0,0,0)$.

As a result, the code sets ($A_1$,$B_1$) and ($C_1$,$D_1$) are N.I.C. codes since they fulfill the requirement of equation (3) that the sum of the corresponding terms of their cross-correlation functions is identically zero in all terms.

If a complementary pair (A,B) is given, equations (1), (2) and (3) can be solved sequentially in $i$ to find an N.I.C. pair (C,D). For example, Golay gives the length ten complementary code ($A_3$,$B_3$), where:

$A_3=(-1,1,-1,1,-1,-1,-1,-1,1,1)$, and $B_3=(-1,-1,-1,-1,1,-1,-1,1,1,-1)$.

By following the above procedure, the complementary pair ($A_3$,$B_3$) is found to have the following N.I.C. pair:

$C_3=(1,-1,-1,1,1,-1,1,1,1,1)$, and $D_3=(1,1,-1,-1,-1,-1,1,-1,1,-1)$.

A complementary code pair of length N which is not derivable from a shorter complementary code pair is defined by Golay as a kernel. The search for an original kernel is a random process and may be best accomplished with the aid of a computer. Once a kernel is found, a longer complementary code pair can be formed by applying certain algorithms in Golay's aforementioned article to the kernel. In a like manner, once a pair of N.I.C. kernels is found, a longer pair of N.I.C. codes can be formed. For example, the previously given N.I.C. code sets of ($A_1$,$B_1$) and ($C_1$,$D_1$) may be expanded in the aforementioned manner to produce the length eight N.I.C. code sets (A,B) and (C,D), where:

$A=(-1,-1,-1,+1,-1,-1,+1,-1)$, $B=(-1,-1,-1,+1,+1,+1,-1,+1)$, $C=(-1,+1,-1,-1,-1,+1,+1,+1)$, and $D=(-1,+1,-1,-1,+1,-1,-1,-1)$.

The transducers 407 and 411, shown mechanized in FIG. 1, develop this A-code. The transducers 409 and 413, 416 and 418, and 417 and 419 can be also mechanized in a similar fashion to respectively develop the B,C and D codes. Reference should also be made to FIG. 6 in conjunction with the following explanation regarding the A,B,C and D codes and the autocorrelation and cross-correlation functions associated therewith.

The autocorrelation functions of the A,B,C and D codes have the terms as shown in FIG. 6 and in the following:

$AA=(1,0,1,0,3,0,-1,8,-1,0,3,0,1,0,1)$, $BB=(-1,0,-1,0,-3,0,1,8,1,0,-3,0,-1,0,-1)$, $CC=(-1,0,-1,0,-3,0,1,8,1,0-3,0,-1,0,-1)$, and $DD=(1,0,1,0,3,0,-1,8,-1,0,3,0,1,0,1)$.

The respective summing of corresponding terms of the autocorrelation functions AA and BB and of the autocorrelation functions CC and DD discloses that each of the complementary code sets (A,B) and (C,D) fulfills Golay's requirements in equations (1) and (2) for complementary codes, as shown in FIG. 6 and in the following:

$AA+BB=(0,0,0,0,0,0,0,16,0,0,0,0,0,0,0)$, and $CC+DD=(0,0,0,0,0,0,0,16,0,0,0,0,0,0,0)$.

The cross-correlation functions of the complementary code sets (A,B) and (C,D) are shown in FIG. 6 and in the following:

$AC=(-1,-2,-3,0,1,2,-1,0,1,2,-1,0,3,-2,1)$, and $BD=(1,2,3,0,-1,-2,1,0,-1,-2,1,0,-3,2,-1)$.

The sums of the corresponding terms of the cross-correlation functions of the complementary code sets (A,B) and (C,D) are shown in FIG. 6 and in the following:

$AC+BD=(0,0,0,0,0,0,0,0,0,0,0,0,0,0,0)$ As a result, the code sets (A,B) and (C,D) are N.I.C. codes, since they fulfill the requirement of equation (3) that the sum of the corresponding terms of their cross-correlation functions is identically zero in all terms.

It has therefore been shown in the embodiment of FIG. 1 that by using four transmit and four receive transducers per pair of transmission channels and designing the transducers to develop N.I.C. codes, each pair of transmission channels can accommodate a pair of signal channels, thereby producing a factor of two improvement over the one signal channel system of FIG. 2.

Figure 7:
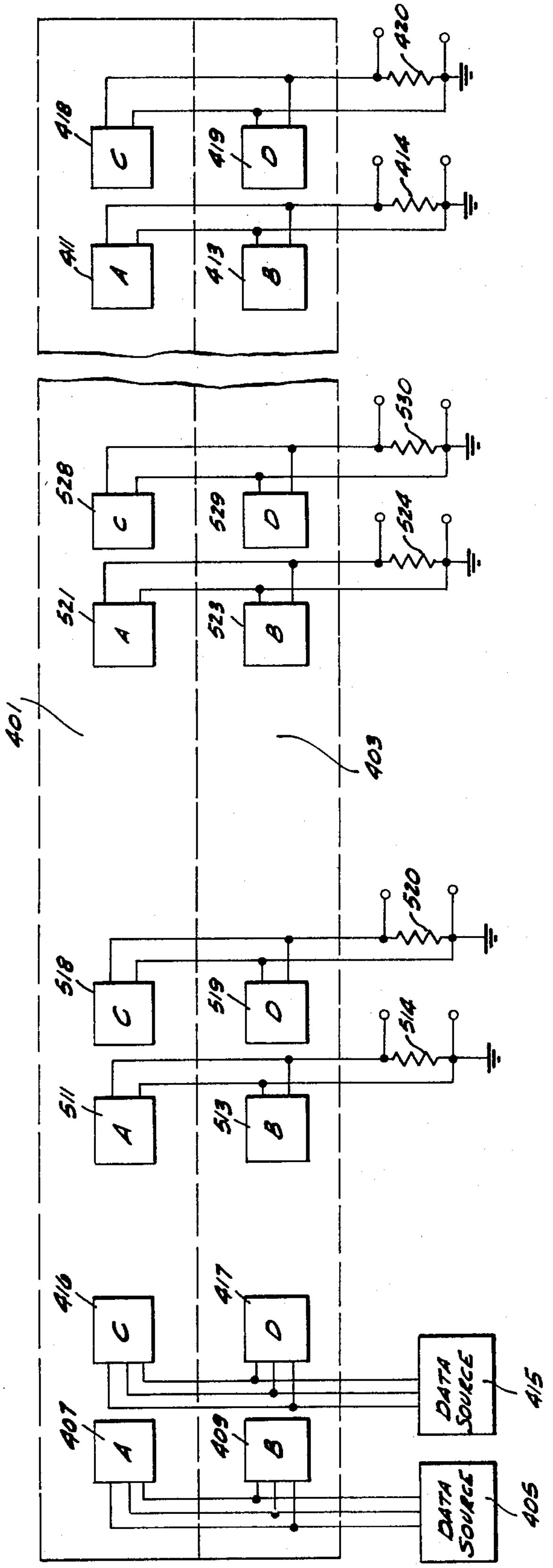
FIG. 7 is a schematic block diagram of a modification of the embodiment of FIG. 1.

FIG. 7 illustrates a modification of the embodiment of FIG. 1 to obtain a sequence of delayed outputs from each signal channel for each digital bit applied from an associated data source. This enables the circuit of FIG. 7 to function as a tapped delay line.

In FIG. 7, the structure, arrangement and operation of the data sources 405 and 415, the transmission channels 401 and 403, the group of transmit transducers 407, 409, 416 and 417, and the first group of receive transducers 411, 413, 418 and 419 have already been discussed in relation to the embodiment of FIG. 1 and hence will not be further discussed. A second group of receive transducers 511, 513, 518 and 519, and a third group of receive transducers 521, 523, 528 and 529, each group being respectively identical in structure connection and operation to the first group of receive transducers 411, 413, 418 and 419, are respectively serially positioned at first and second positions in the channels 401 and 403 between the transmit and first receive transducer groups, pursuant to the previous teachings in relation to the placement of transducers in the embodiment of FIG. 1. The parallel-coupled output terminals of the transducers 511 and 513, of the transducers 518 and 519, of the transducers 521 and 523, and of the transducers 528 and 529 are respectively coupled across output summers or resistors 514, 520, 524 and 530 in order to develop outputs from the two signal channels at various time intervals along the medium. The respective resistors 514, 524 and 414 sequentially sum the autocorrelation functions of the A and B coded sequences respectively generated by the transmit transducers 407 and 409 in order to develop a first data stream output at three different invervals along the medium in the first signal channel. In a like manner, the respective resistors 520, 530 and 420 sequentially sum the autocorrelation functions of the C and D coded sequences respectively generated by the transmit transducers 416 and 417 in order to develop a second data stream output at three different intervals along the medium in the second signal channel. A greater or smaller number of delay intervals can be realized by increasing or decreasing the number of groups of receive transducers.

The digital information contained in each of the signal outputs, that were respectively developed across the resistors 514, 520, 524, 530, 414 and 420, may be retrieved by utilizing either synchronous sampling techniques or a pair of comparators with each corresponding summer, as previously discussed. Since the type of medium determines the rate of propagation through the medium, and the distance between corresponding fingers on a transmit transducer and a correspondingly coded receive transducer determines the delay time in a signal channel, a careful selection of the type and length of the medium, and a selective placement of the receive transducers in each signal channel will permit a wide variety of different delay intervals to be realized. It may, however, be necessary in the circuitry of FIG. 7, as well as the circuitry of FIG. 1, to amplify the output that is developed across each summer to a higher voltage level before it is used in any of the manners described.

The utilization of the N.I.C. coding system of FIG. 7 in cyclic operations, such as in manufacturing processes, would allow a greater multiplicity of different delayed output signals, in either or both signal channels in a pair of transmission channels, to selectively initiate a sequence of operations to be performed in the manufacturing process. Furthermore, the delayed output signals in each signal channel may be used to control one sequence of operations, or may be used separately to respectively control two independent sequences of operation at the same time. Of course, this is only one application for the tapped delay line of FIG. 7. The tapped delay line of FIG. 7 can be used in any application which requires a multiplicity of delayed output signals. In recirculating memory applications, the system of FIG. 7 can be used to reduce the access time in each signal channel.

The invention thus provides a non-interacting complementary coding system for substantially doubling the information storage capacity of two transmission channels employing complementary coding techniques, since an N.I.C. coding system allows two independent signal channels to commonly share a pair of transmission channels without any interaction between the two signal channels.

While the salient features have been illustrated and described with respect to transmission channels on the surface of an acoustic medium as used in acoustic delay lines, it should be understood that the concepts of the N.I.C. coding system apply to any pair of transmission channels. For example, an N.I.C. coding system could be utilized in any system, such as a radar or laser system, that uses complementary codes to achieve pulse compression. In general, this invention can be used in any system that uses complementary codes. It should also be understood that non-binary extensions of the binary approach disclosed in this specification are within the scope of this invention. For example, although a binary coding approach to delay line utilization is discussed in this specification, the principles set forth therein are not restricted to binary coding. In particular, a multilevel coding scheme or a combination of coding schemes may be utilized, within the scope of this invention. It should, therefore, be readily apparent to those skilled in the art that modifications can be made within the spirit and scope of the invention as set forth in the appended claims.

I claim:

1. A two channel system comprising:

first means for providing pluralities of coded sequences A and C in the first channel;

second means for providing pluralities of coded sequences B and D in the second channel, each of said A, B, C and D coded sequences being of N bits in length;

third and fourth means for respectively receiving said pluralities of coded sequences A and C in said first channel for respectively developing autocorrelation functions AA and CC and cross-correlation function AC;

fifth and sixth means for respectively receiving said pluralities of coded sequences B and D in said second channel for respectively developing autocorrelation functions BB and DD and cross-correlation function BD, each of the functions AA, BB, CC, DD, AC and BD being of 2N−1 bits in length;

seventh means coupled to said third and fifth means for summing corresponding terms of the functions AA, BB, AC and BD to develop a first output which is zero for all corresponding terms except the Nth term; and eighth means coupled to said fourth and sixth means for summing corresponding terms of the functions CC, DD, AC and BD to develop a second output which is zero for all corresponding terms except the Nth term.

2. A system comprising:

an acoustic structure having a surface with first and second ends and with first and second channels thereon providing transmission paths between said first and second ends;

first and second data sources for respectively generating first and second pluralities of input digital signals;

first and second input transducers in said first channel respectively positioned along the path near the first end and respectively coupled to said first and second data sources, said first and second input transducers being respectively responsive to each first and each second input digital signals for respectively developing first and second coded sequences therefrom;

third and fourth input transducers in said second channel respectively positioned along the path near the first end and respectively coupled to said first and second data sources, said third and fourth input transducers being respectively responsive to each first and each second input digital signals for respectively developing third and fourth coded sequences therefrom;

first and second output transducers in said first channel respectively positioned along the path near the second end to respectively develop the auto correlation functions of the first and second coded sequences;

third and fourth output transducers in said second channel respectively positioned along the path near the second end to respectively develop the autocorrelation functions of the third and fourth coded sequences;

first summing means coupled to said first and third output transducers for summing the autocorrelation functions of said first and third coded sequences to develop a first output digital signal for each input digital signal supplied by said first data source; and second summing means coupled to said second and fourth output transducers for summing the autocorrelation functions of said second and fourth coded sequences to develop a second output digital signal for each input digital signal supplied by said second data source, said first and third coded sequences being respectively non-interacting with said second and fourth coded sequences since the sum of the cross-correlation function of the first coded sequence developed in said second output transducer and the cross correlation function of the third coded sequence developed in said fourth output transducer is zero and since the sum of the cross-correlation function of the second coded sequence developed in said first output transducer and the cross correlation function of the fourth coded sequence developed in said third output transducer is zero.

3. The system of claim 2 wherein:

said acoustic structure is composed of a non-piezoelectric material; and said first, second, third and fourth input transducers and said first, second, third and fourth output transducers are each layered transducers, each layered transducer including a metallic interdigital thin film fingered device deposited on said surface of said non-piezoelectric material and a thin film piezoelectric material deposited on said device.

4. The system of claim 2 wherein:

said acoustic structure is composed of a piezoelectric material; and said first, second, third and fourth input transducers and said first, second, third and fourth output transducers are each interdigital transducers, each interdigital transducer being a metallic interdigital thin film fingered device deposited on said surface of said piezoelectric material.

5. A system comprising:

an acoustic structure providing first and second transmission paths between first and second positions;

first and second means for respectively receiving first and second pluralities of input digital signals;

third and fourth means respectively positioned in the first and second transmission paths at the first position, said third and fourth means being coupled to said first means for respectively providing coded bit sequences A and B in response to each of the first plurality of input digital signals therefrom;

fifth and sixth means respectively positioned adjacent to said third and fourth means in the first and second transmission paths near the first position, said fifth and sixth means being coupled to said second means for respectively providing coded bit sequences C and D in response to each of the second plurality of input digital signals therefrom;

seventh and eighth means respectively positioned in the first and second transmission paths near the second position for respectively developing autocorrelation functions AA and BB and for respectively developing the cross correlation functions AC and BD, each of the functions AA, BB, AC and BD being 2N−1 terms in length;

ninth and tenth means respectively positioned adjacent to said seventh and eighth means in the first and second transmission paths near the second position for respectively developing autocorrelation functions CC and DD and for respectively developing the cross-correlation functions AC and BD, each of the functions CC, DD, AC and BD being 2N−1 terms in length;

eleventh means coupled to said seventh and eighth means for summing corresponding terms of the AA, BB, AC and BD functions to develop a first output which is zero for all corresponding 2N−1 terms except the Nth term, said eleventh means developing a first output for each of the first plurality of input signals; and twelfth means coupled to said ninth and tenth means for summing terms of the CC, DD, AC and BD functions to develop a second output which is zero for all corresponding 2N−1 terms except the Nth term, said twelfth means developing a second output for each of the second plurality of input signals.

* * * * *